No. 700,644. Patented May 20, 1902.
J. HARTNESS.
FLUID REGULATING DEVICE.
(Application filed Jan. 21, 1901.)
(No Model.)

WITNESSES.
INVENTOR.

UNITED STATES PATENT OFFICE.

JAMES HARTNESS, OF SPRINGFIELD, VERMONT.

FLUID-REGULATING DEVICE.

SPECIFICATION forming part of Letters Patent No. 700,644, dated May 20, 1902.

Application filed January 21, 1901. Serial No. 44,072. (No model.)

*To all whom it may concern:*

Be it known that I, JAMES HARTNESS, of Springfield, in the county of Windsor and State of Vermont, have invented certain new and useful Improvements in Fluid-Regulating Devices, of which the following is a specification.

This invention has relation to devices for measuring or regulating the flow of liquids, and while its present form is designed more particularly to serve as a regulator for fluid-operated machines, yet it may be constructed in a variety of ways for a variety of purposes and uses.

Figure 2:
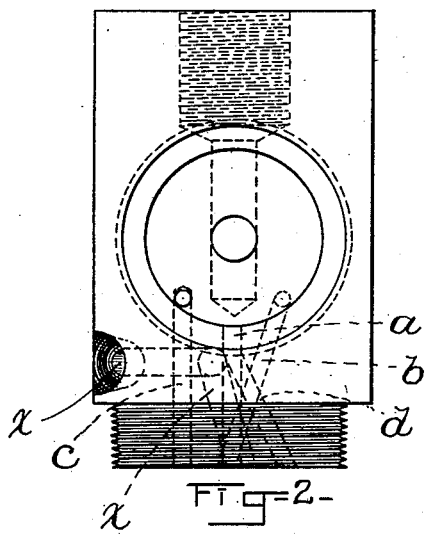
Figure 3:
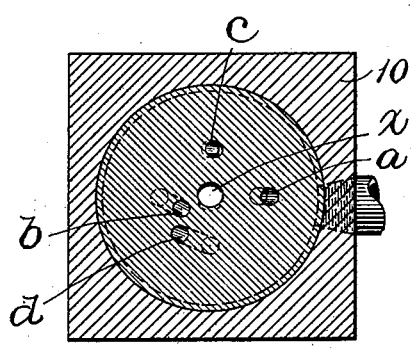
Figure 4:
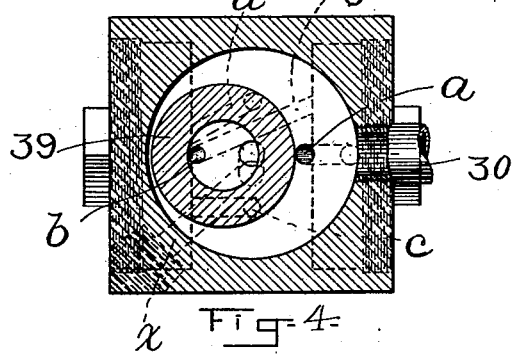
Figure 1:
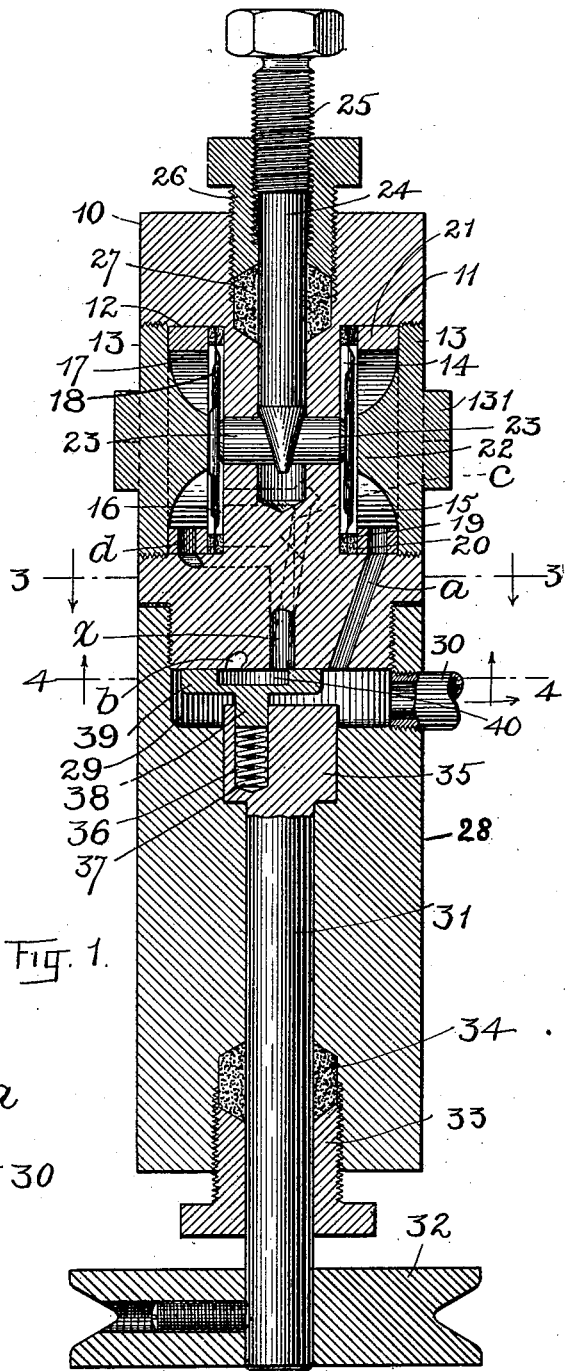

Referring to the drawings which illustrate one embodiment of the invention, Figure 1 represents a longitudinal section therethrough. Fig. 2 represents a side elevation of the upper part of the apparatus. Fig. 3 represents a section on the line 3 3 of Fig. 1. Fig. 4 represents a section on the line 4 4 of Fig. 1.

In Letters Patent No. 635,888, granted to me October 31, 1899, there is illustrated and described a turret-lathe in which the carriage is operated by fluid-pressure. In such machines it is necessary or desirable in order to effect a regular and even movement of the parts to employ a liquid regulation. This is especially true where a tool is actuated primarily by a yielding pressure in order that the tool may be forced steadily and evenly against the work. In the liquid regulation of these machines the employment of the ordinary throttle-valve is not sufficient, and I have therefore provided a metering or measuring apparatus for delivering just the quantity or volume of liquid that is requisite to move the fluid-actuated part at the desired speed and with the desired force.

Considered in its elemental form, the invention consists of an expansion-chamber with means whereby fluid is admitted thereinto and forced out therefrom, the extent of the expansion and contraction of the chamber and the number of expansions and contractions thereof in a given time determining the amount or quantity of fluid that passes therethrough. Preferably two expansion-chambers are employed having a common resilient wall which constitutes a movable member between them.

According to the illustrated form of the invention liquid is admitted first to one chamber and then to the other, the admission of liquid to one of them serving to cause the egress of a predetermined quantity of liquid from the other, and vice versa. The movable member in this form of the invention consists of a resilient wall or partition, such as a metallic diaphragm, which is adapted to yield at its center and which may be secured tightly at its edges, so as to prevent leakage of the liquid from one compartment to the other. This form has many advantages, since the liquid which passes through it may be more accurately measured than where a sliding piston serves as a movable member, since the liquid is liable to leak past it and prevent the accurate regulation of the liquid. Moreover, the employment of a diaphragm renders the apparatus adaptable for use in all classes of fluid-operated machines.

Referring to the drawings, 10 indicates a casing in which are formed two cylinders 11 and 12 diametrically opposite each other. The outer end of each cylinder is closed by a head 13, having a polygonal boss 13', by which it may be rotated, said head being provided with threads whereby it may be screwed into place. Each cylinder 11 and 12 is divided into two chambers 14 15 16 17, respectively, by a diaphragm 18. Said diaphragm may be corrugated, as indicated, or smooth, and it is formed of resilient or yielding material, such as sheet metal. It is confined at its edges between two packing-rings 19 20, which are forced together by an annulus 21, against which the head 13 presses. This diaphragm forms in each cylinder two expanding chambers having a common wall, so that the two chambers of each cylinder may be alternately expanded to expel the liquid from the opposing chamber, as will be readily understood.

Each of the heads 13 is provided with an internal boss to limit the outward movement of the diaphragm, and to limit the inward movement of the same there are two adjustable pins 23 23, having their inner ends beveled to form a V-space. A pin 24, having a conical end, is inserted in the end of the casing 10 and may be raised or lowered to adjust the adjusting-pins 23. The pin 24 is provided with screw-threads 25, as indicated, and is passed through a stuffing-box 26 and packing-glands 27. I shall now describe how fluid is fed into and out of the several expanding chambers.

The lower end of the casing 10 is reduced and threaded to receive a second casing 28, which accurately registers therewith, the two together forming one complete casing. The portion 28 is provided with a chamber 29, from which leads an exhaust-pipe 30. The shaft 31 is journaled in the casing 28 and is equipped at its end with a belt-pulley 32, being passed through a stuffing-box and packing-glands 34. On its inner end the shaft is provided with a head 35, having an eccentric socket 36 to receive a coiled spring 37 and the stem 38 of the circular valve 39. The valve has a concentric circular chamber 40. Leading from the four expanding chambers are four ducts $a\ b\ c\ d$, which open into the chamber 29 and have their mouths arranged, as shown in Fig. 4, at equal distances from the axis of the shaft 31. The valve 39 is so formed that two of the ducts are always open and two are always closed, the ducts $a\ d\ b\ c$ being opened and closed successively in the order named. Arranged in the center of the casing 10 is the mouth of the inlet-duct $x$, the aperture for the inlet-pipe being shown in Figs. 2 and 4. This inlet-duct always communicates with chamber 40 of the valve 39 and opens communication between said duct and each of the ducts $a\ d\ b\ c$ successively.

The operation of the apparatus will be easily understood from the foregoing description.

Liquid enters at all times under pressure the duct $x$, and assuming that the parts are in the position shown in Figs. 3 and 4 the liquid flows under pressure through duct $b$ into the expanding chamber 14 and forces the diaphragm outward, the port or duct $a$ now serving as an exhaust. As the valve continues its movement the ducts $a$ and $b$ are closed and liquid flows through duct $d$ into compartment 17, forcing the diaphragm inward. When the valve reaches a position diametrically opposite that shown in Fig. 4, liquid flows through a duct $a$ into the expanding-chamber 15, and thus forces out the liquid from chamber 14 through the duct $b$ into exhaust-chamber 29. A still further movement of the valve permits liquid to pass through ducts $c$ into compartment 18 and force the diaphragm outward, with the effect that the liquid in compartment 17 passes into the exhaust-chamber 29. Thus each time the shaft 31 makes a single rotation a predetermined quantity of liquid flows into and out of each of the inlet expanding compartments. Hence so long as the pressure in the exhaust-chamber is less than the pressure in the inlet-chamber the liquid may be forced out through exhaust-pipe 30 in predetermined quantities. By screwing in or out the wedge-pointed screw I control the movement of the diaphragms, and thereby the degree of expansion and contraction of the chamber, and hence the quantity of liquid measured by the device is controlled by the screw. Of course a change of speed of rotation of the valve-shaft will effect a corresponding change in the liquid measured without a change of said wedge-pointed screw; but I prefer in this device to effect the change in delivery by limiting the stroke of the diaphragm. After ascertaining the degree of movement of the diaphragm and the size of the expansion-chambers the quantity of liquid which flows through the casing may be ascertained by registering the number of rotations of the shaft 31. The use to which I, as stated, may put the regulating apparatus described is that of regulating or governing the passage of fluid to the operating-cylinders in a turret-lathe or other machine where it is desirable that the parts should operate regularly and at an unvarying predetermined speed, and consequently where it is desired to accelerate or decrease the speed of such parts I may automatically or manually regulate the adjustment of the stroke-limiting pins 23 or the speed at which the pulley 32 is rotated.

In a lathe the pulley 32 is constantly rotated by suitable connections with some rotary member independently of movement of the diaphragms.

In thus specifically describing the construction of the illustrated form of my invention I do not mean to lay any particular stress upon any one feature of the device or to limit myself thereto, save to the employment of expanding chambers, for I may vary the style of valve, the means for driving it, and the other parts of the device without departing from the spirit and scope of the invention.

Having thus explained the nature of the invention and described a way of constructing and using the same, although without attempting to set forth all of the forms in which it may be made or all of the modes of its use, I declare that what I claim is—

1. A fluid regulating or measuring device comprising a two-part casing having a chamber formed between them, measuring means including a fluid-operated member located in one section of the casing, a valve independent of said member and located in said chamber, and means passing through the other section of said casing for operating said valve.

2. A fluid regulating or measuring device comprising a casing having a plurality of chambers with independent movable elements therein, inlet and outlet ducts leading from said chambers, and having their mouths arranged about a common center, and a centrally-located inlet-conduit, and an eccentric valve governing the passage of fluid through said ducts in succession.

3. A fluid regulating or measuring device comprising an expanding compartment having a resilient wall, means for permitting the ingress and egress of fluid into and out of said chamber, a continuously-rotatable valve operable independently of movement of the resilient wall, and an adjustable wall for said chamber having a boss for limiting the play of said resilient wall.

4. A fluid regulating or measuring device comprising an expanding compartment having a resilient wall, means for permitting the ingress and egress of fluid into and out of said compartment, a continuously-rotatable valve operable independently of movement of the resilient wall, a pin arranged to limit the play of said resilient wall, and an adjustable conical pin adapted to engage the first-mentioned pin for adjusting it.

5. A fluid regulating or measuring device comprising an expanding compartment having a resilient wall, means for permitting the ingress and egress of fluid into and out of said chamber, a valve operable independently of the said resilient wall, a continuously-rotatable shaft on which the valve is eccentrically mounted, and a spring interposed between said valve and said shaft for holding said valve against its seat.

6. A fluid regulating or measuring device comprising a casing having two oppositely-disposed chambers each provided with a diaphragm which divides it into two expanding compartments, stops for limiting the movement of said diaphragms, and means for simultaneously adjusting said stops.

In testimony whereof I have affixed my signature in presence of two witnesses.

JAMES HARTNESS.

Witnesses:
W. LE ROY BRYANT,
HORACE BROWN.